(12) United States Patent
Kim

(10) Patent No.: US 6,343,180 B1
(45) Date of Patent: *Jan. 29, 2002

(54) APPARATUS AND METHOD FOR PRODUCING REPRODUCTION TIME OF AN OPTICAL DISC

(75) Inventor: Young Chul Kim, Seoul (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,632

(22) Filed: Dec. 4, 1997

(30) Foreign Application Priority Data

Jan. 6, 1997 (KR) .................................. 97-113

(51) Int. Cl.[7] ............................ H04N 5/76; H04N 5/781
(52) U.S. Cl. ........................... 386/65; 386/126; 369/32
(58) Field of Search .............................. 386/4, 45, 65, 386/95, 111, 92, 125, 126; 348/423; 358/339; 369/32

(56) References Cited

U.S. PATENT DOCUMENTS

| | | | | |
|---|---|---|---|---|
| 5,502,573 A | * | 3/1996 | Fujinami | 358/339 |
| 5,655,052 A | * | 8/1997 | Nakai et al. | 386/125 |
| 5,661,526 A | * | 8/1997 | Hamamoto et al. | 386/85 |
| 5,825,965 A | * | 10/1998 | Kizu | 386/52 |
| 5,854,873 A | * | 12/1998 | Mori et al. | 386/92 |
| 5,870,523 A | * | 2/1999 | Kikuchi et al. | 386/95 |
| 5,923,811 A | * | 7/1999 | Kawamura et al. | 386/65 |
| 6,009,234 A | * | 12/1999 | Taira et al. | 386/95 |

* cited by examiner

Primary Examiner—Thai Tran

(57) ABSTRACT

Reproduction time of an optical disc, including produced time or remaining time, is determined and displayed by detecting the time codes in the system or control data of the DVD. Reproduced signals are processed, time codes from the reproduced signal data are detected, and the reproduction time is computed based on the time codes and displayed. Performed time and/or remaining time may be produced by detecting the title time codes, the cell time codes and the time codes in VOBU information, and thereafter by decoding the time codes into sub-reproduction-time followed by an operation of summing and/or subtracting. The reproduction time of the DVD may be determined, even though the length of the sector in the DVD is not fixed as the length of the sector in the CD. Therefore, the user is able to acquire the performed time and/or the remaining time of the present title.

9 Claims, 14 Drawing Sheets

| FILE REPRODUCTION TIME (A) | CELL REPRODUCTION TIME (B) | VOBU REPRODUCTION TIME (C) | TITLE REPRODUCTION TIME (P) |
|---|---|---|---|
| PGC1 + PGC2 | CELL1 | VOBU1 + VOBU2 + VOBU3 | PGC1 + PGC2 + PGC3 |

FIG. 9B

APPARATUS AND METHOD FOR PRODUCING REPRODUCTION TIME OF AN OPTICAL DISC

BACKGROUND OF THE INVENTION

1. Field of the Invention

The present invention relates to an apparatus and method for producing reproduction time of an optical disc, and, more particularly, to an apparatus and method for producing the reproduction time by detecting time codes from system data of the optical disc.

2. Description of Prior Art

A Compact Disc (referred to as "CD" hereinafter) is currently one of the most widely used recording media for optical discs. The CD is broadly used as a recording medium in various recording media fields, including the audio and computer fields. Some of the advantages achieved by using the CD as a recording medium are that the CD has a greater recording capacity than other conventional recording media, the CD can be preserved permanently, and the CD is easy to move due to its small size. Additionally, CDs record data digitally, preserving the data without deterioration even if the CD is used repeatedly.

A Digital Video Disc (referred to as "DVD" hereinafter) has been recently developed as a new recording medium. The DVD has all the above-noted characteristics of the CD. Additionally, the DVD is able to store moving images as well as numbers, characters, figures and voices. The recording capacity of one recording side of a DVD is about 6–7 times the recording capacity of the CD. Consequently, the DVD has become popular as an alternative recording medium to the CD. Furthermore, the DVD has become the focus in the recording media market, including the video, audio and computer fields.

The CD and DVD, as illustrated in FIG. 1, generally are composed of a Lead-In area, a data recording area and a Lead--Out area. The Lead-In area is placed in a predetermined area near the center of the disc, the Lead-Out area is placed at the periphery of the disc, and the data recording area is placed therebetween, extending from the end of the Lead-In area toward the periphery of the disc before the Lead-Out area begins. The disc has a plurality of tracks for storing data. Main data, e.g. video/audio data, are stored in each track as a sector/unit. That is, predetermined video/audio data are stored on the plurality of tracks on the recording surface of the optical disc, as a sector/unit. Data stored in the CD and/or DVD is reproduced by reproducing the data stored in the sectors/units.

The length of a sector on a track in a CD is preset. In each track, there exists an absolute address which announces positions on the track based on the sectors. Since the CD is frequently used in audio and computer related applications, and data used in the fields is arranged such that data of the same volume occupies the same amount of space, each sector of a formatted CD having a pre-set length enabling those sectors to store data having a fixed volume. When the absolute address is detected for a sector on a track whose data is being reproduced, the position of the data being reproduced on the track, and therefore the related reproduction time, may be produced. That is, reproduction time is determined based on the relative positions of recorded data since CDs store constant length sections of data.

By contrast, data stored in the DVD represents moving images, such as video signals. The data representing the moving images is stored such that the storage space occupied by a predetermined amount of data is variable and dependant on the position of the data being reproduced from the DVD. Therefore, the reproduction time of a certain amount of data stored on the disk is not fixed, nor is the reproduction time dependant on the position (e.g., absolute address) of the data on the DVD. Further, when recording on a DVD, moving images such as video signals are recorded as sectors/units, with the length of each sector differing according to the volume of the data or the recording position. As a result, if only the address of a sector is detected, it is not possible to determine the physical reproducing position and the reproduction time of the data on the DVD which is presently reproduced.

SUMMARY OF THE INVENTION

An object of the present invention is to improve upon the conventional reproduction of data stored in the DVD.

To accomplish this and other objects, a first embodiment of the present invention includes an apparatus and method for determining reproduction time of a program on a disk. A first device determines time code data based on control data that indicates a position of the program on the disk and that is stored on the disk. A second device determines reproduction time of the program based on the time code data.

The first device may include a detector for detecting the control data stored on the disk, and a processor for determining the time code data based on the control data. The processor computes the time code data based on the control data. More specifically, the processor generates an output based on first time code data associated with first data units and second time code data associated with second data units, each first time code data indicating reproduction time of an associated first data unit and each second time code data indicating reproduction time of an associated second data unit. The second device determines the reproduction time based on the output generated by the processor.

Alternatively, the processor may generate an output based on first time code data associated with first data units and second time code data associated with a second data unit, where each first time code data indicates reproduction time of an associated first data unit and the second time code data corresponding to reproduction time of at least the associated second data unit, and where the second device determines the reproduction time based on the output generated by the processor. In this alternative case, the second time code data corresponds to a summation of reproduction time for the associated second data unit and other second data units preceding the associated second data unit.

A second embodiment of the present invention also includes an apparatus and method for determining reproduction time of a program on a disk. This embodiment includes a detector for detecting first time code data associated with first data units, a detector for detecting second time code data associated with second data units, and a device for determining a reproduction time based on the detected first and second time code data.

Each first time code data is included in a header of an associated data unit. Each first time code data indicates reproduction time of an associated first data unit, each second time code data indicates reproduction time of an associated second data unit.

A detector may also be provided for detecting additional time code data associated with a data unit in a header of a DVD corresponding to a video object unit (VOBU). The additional time code data corresponds to reproduction time of the associated second data unit, and to a summation of reproduction time for said associated second data unit and other second data units preceding said associated second data unit. In this case, the processor calculates the reproduction time based on the first time code data and the additional time code data.

The reproduction time may represent an amount of time included in a portion of a program already reproduced, or it may represent an amount of time in a portion of a program remaining to be reproduced.

If the later case, a detector may be used for detecting a total reproduction time of a program being reproduced, and a processor is used for calculating said reproduction time based on a difference between said total reproduction time and the above-described time code data. For instance, when the second or additional time code data is detected, the processor may calculate the reproduction time based on a difference between the total reproduction time and various combinations of the first time code data, the second time code data, and the additional time code data.

The reproduction time (the performed time and/or the remaining time) of the optical disc is able to be displayed on the screen of a display according to the present invention in response to the request of a user. Therefore, the present invention has the advantage that the user maybe able to acquire the performed time and/or the remaining time of the present title.

In each of the above-described cases, the first and second data units are stored on a digital versatile disk (DVD), the first data units corresponding to program chains (PGCs) and the second data units corresponding to cells.

Further scope of applicability of the present invention will become apparent from the detailed description given hereinafter. However, it should be understood that the detailed description and specific examples, while indicating preferred embodiments of the invention, are given by way of example only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent from the following detailed description with the accompanying drawings, which are given by way of illustration only, and thus are not limitative of the present invention, and in which:

FIG. 9B is a diagram of contents of a buffer memory in processor 15 of FIG. 3.

DETAILED DESCRIPTION OF THE PREFERRED EMBODIMENTS

Reference will now be made in detail to the preferred embodiments of the present invention, examples of which are illustrated in the accompanying drawings.

Prior to describing the method and apparatus of the present invention, a data structure of a general DVD is described with reference to FIG. 2.

Figure 1:
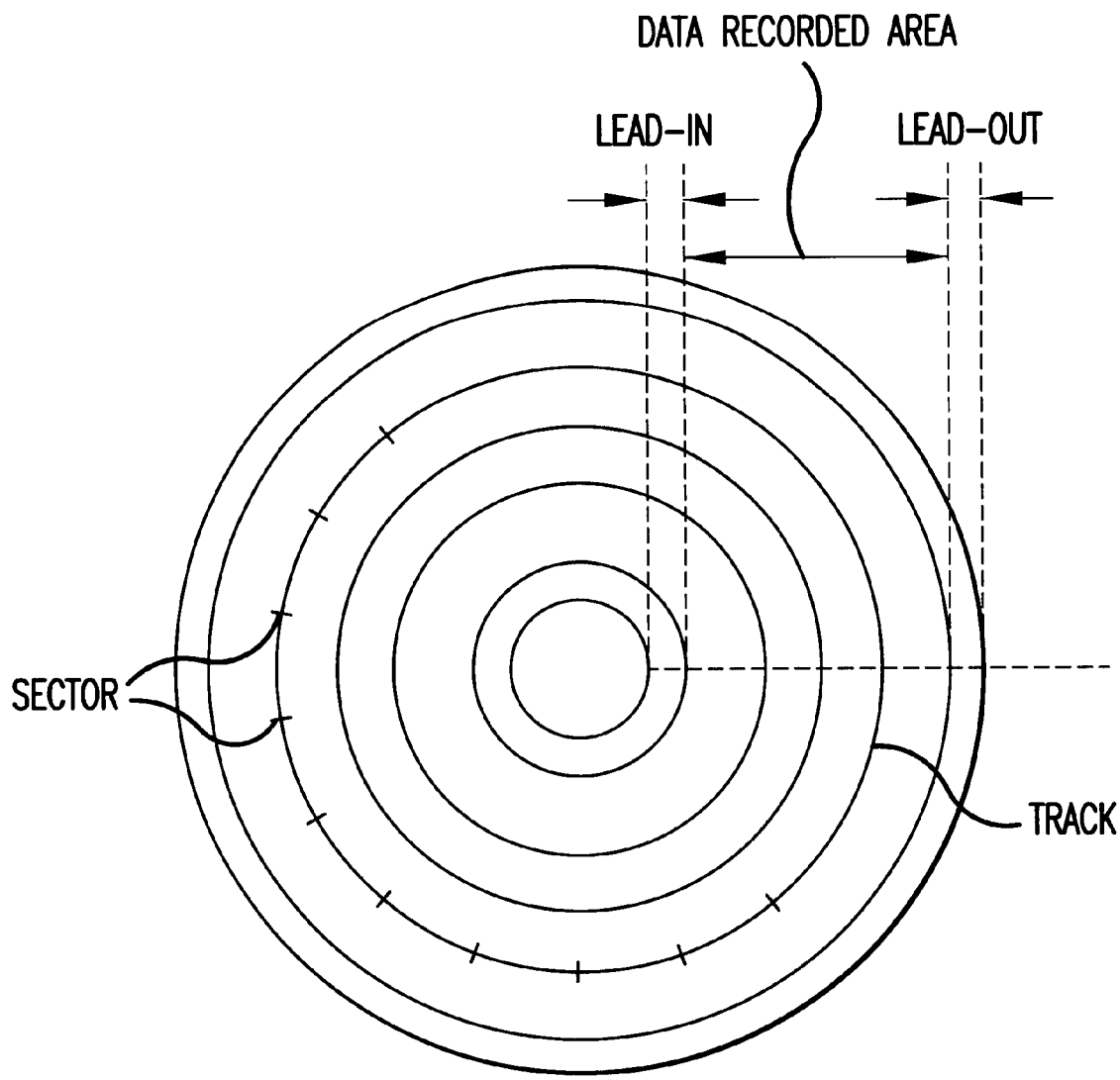
FIG. 1 is a schematic diagram of a general optical disc.
Figure 2:
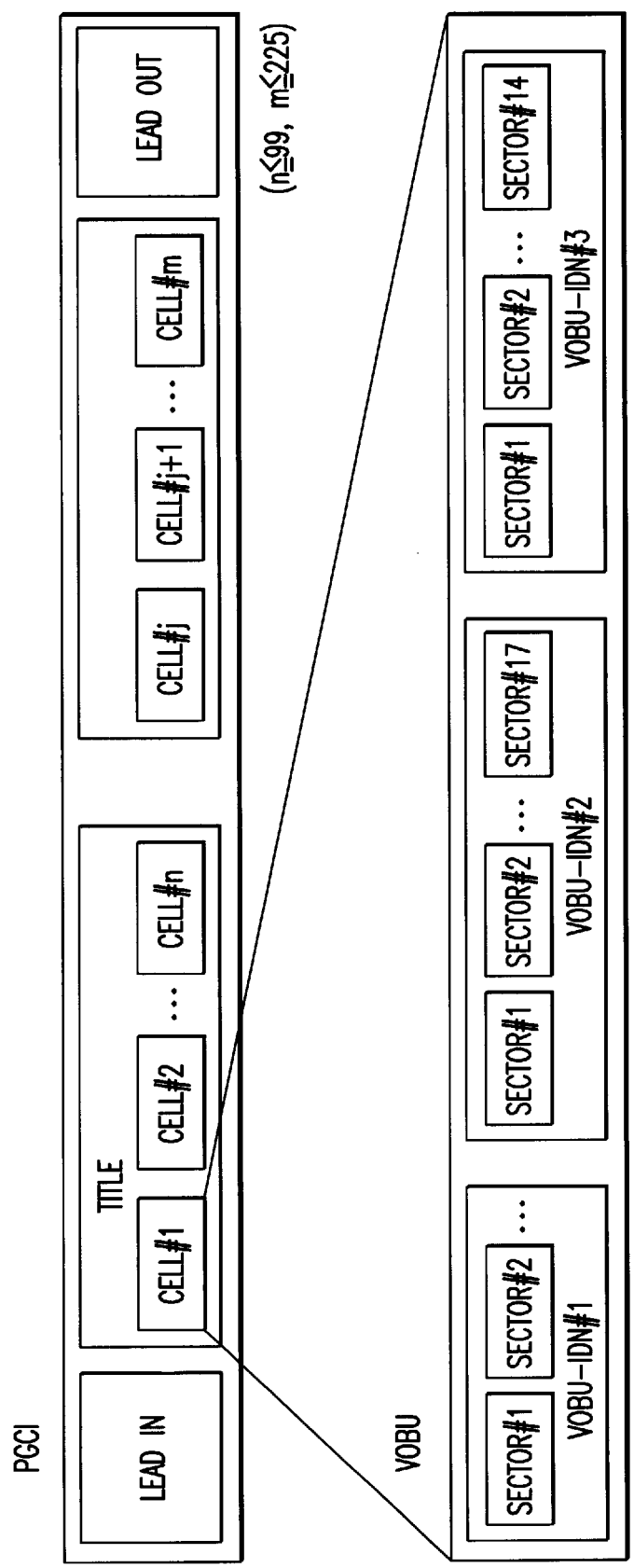
FIG. 2 is a schematic diagram of a DVD system.

FIG. 2 is a schematic diagram of a DVD system. The Program Chain Information ("PGCI") of a DVD includes plural titles between a lead in and lead out area, each title including plural cells. Each cell comprises plural VOBUs, identified in FIG. 2 as VOBU-IDN#1, VOBU-IDN#2 and VOBU-IDN#3. Each VOBU-IDN comprises plural sectors storing main data, i.e. video/audio data.

In order to reproduce a desired title from a plurality of titles contained in the DVD, cell information corresponding to the desired VOBU should be first searched from the PGCI. Once cell information corresponding to a desired title has been identified, the corresponding VOBU is searched based on the cell information and VOBU information. That is, the PGCI, the cell information and the VOBU information are the system data. This system data is necessary for performing control operations which require a determination of a desired position of data sought, in order to reproduce the signal data required by the user from the signal data recorded in the optical disc.

Figure 3:
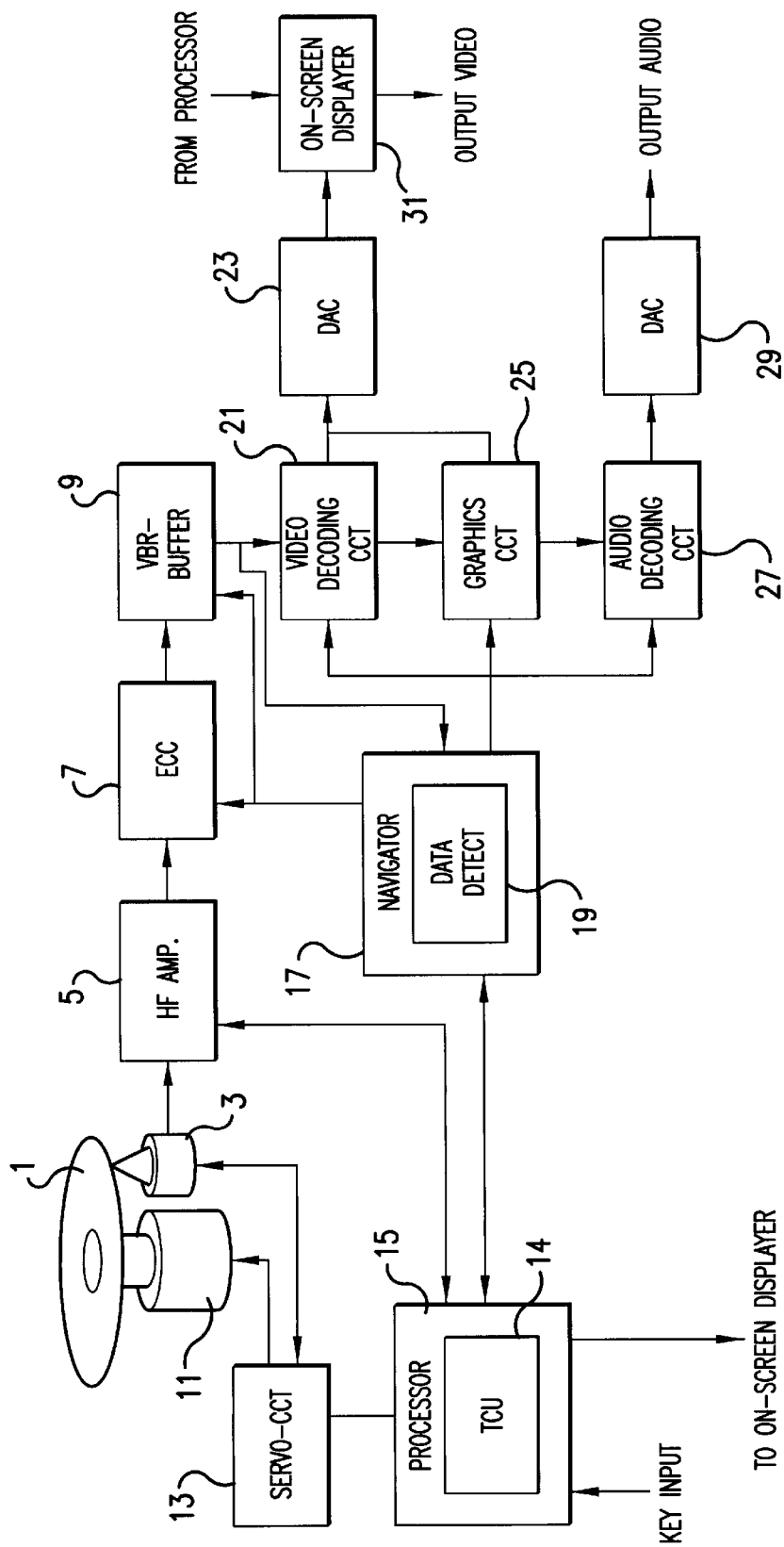
FIG. 3 is a block diagram showing the apparatus for producing the reproduction time of the optical disc according to the present invention.

FIG. 3 is a block diagram showing an example of an apparatus for producing the reproduction time of the optical disc according to the present invention.

The apparatus shown in FIG. 3 comprises: the optical disc 1 on which data is recorded; an optical pick-up apparatus 3 for reading the data recorded on the optical disc 1; a motor 11 for rotating the optical disc 1; a servo-circuit 13 for applying driving signals supplied to the motor 11 and the optical pick-up apparatus 3; and a processor 15 for controlling the operation of the servo-circuit 13.

The processor 15 comprises a time computing unit (TCU) 14 for receiving time code information from a navigator 17, and for decoding and computing time code information to produce the reproduction time. Processor 15 may also include a buffer memory (not shown) for storing time code data detected based on reproduction data stored on the disk. To track an amount of time reproduced in a program, the buffer memory may store time code data corresponding to program chains, cells and video object units of a title that have been previously reproduced. As described in more detail with respect to FIG. 4, time code data may be stored in headers for each of the respective data units including the program chains, cells and video object units. As those data units are reproduced, the corresponding time code data may be read from headers and stored in the processor buffer memory. Processor 15 may be a microprocessor, or other well known processing device.

The apparatus of the present invention further comprises: a high frequency amplifying unit (HF AMP) 5 for processing the signals being output from the optical pickup apparatus 3; an error correcting circuit (ECC) 7 for correcting errors in signals received from the high frequency amplifying unit 5;

and a Variable Bit Rate buffer (VBR Buffer) 9 for temporarily storing error-corrected signals supplied from the error correcting circuit 7.

Navigator 17 communicates with processor 15, the signals that are required for data transmission and for executing control needed to transmit reproduced data output VBR buffer 9. Navigator 17 receives the reproduced data output from VBR buffer 9, analyzes the system data from the reproduced data, detects the time code information, and transmits the detected time code information to processor 15.

The apparatus of the present invention may also comprise: a video signal processing circuit 21 for extracting only video data from the reproduced signal data output from the VBR buffer 9; a graphics circuit 25 for extracting only caption data from the reproduced signal data applied via the video decoding circuit 21; and an audio signal processing circuit 27 for receiving only audio signals the reproduced signal data applied via the graphics circuit 25. Video decoding circuit 21, graphics circuit 25 and audio decoding circuit 27 are controlled by navigator 17. That is, of the reproduced data output from the VBR buffer 9, the video signals are input into the video signal processing circuit 21, the caption signals are input into the graphics circuit 25 and the audio signals are input into the audio signal processing circuit 27. These respective signals are then respectively decoded into respective original signals by the circuits 21, 25 and 27, which may be any circuit capable of decoding such signals.

The apparatus of the present invention may also comprise: a digital/analog converter 23 for mixing decoded video and caption signals respectively generated by video signal processing circuit 21 and graphics circuit 25, and for converting the mixed signal into a analog signal; and an on-screen display 31 for displaying the analog signal output from the digital/analog converter 23 as a character signal under the control of the processor 15. As shown in FIG. 3, the processor 15 outputs control signals to the on-screen display 31. The control signals may be signals for displaying the reproduction time or signals for displaying a menu screen.

The apparatus of the present invention may further comprise an audio digital/analog converter 29 for receiving decoded audio signal from audio digital signal circuit 27, and for converting the decoded audio signal into an analog audio signal. The analog audio signal generated by the audio digital/analog converter 29 is then output, for example, through a speaker (not shown in the attached drawings).

The apparatus for producing the reproduction time of the optical disc according to the present invention is operated as explained below.

When a reproduction key is input, the processor 15 switches the servo-circuit 13 to a initial state. When switched to an initial state, the servo-circuit 13 drives the motor 11 by outputting a first driving signal, and outputs a second driving signal to the optical pick-up apparatus 3 which reads the data recorded on the optical disc 1. The optical pick-up apparatus 3 then outputs signals which are read by the optical pick-up apparatus and which correspond to the data recorded on the optical disc 1 to the servo-circuit 13 and the high frequency amplifying unit 5. Based on the signals output from optical pick-up apparatus 3, the servo-circuit 13 generates tracking error signals and focusing error signals, thereby continuously adjusting tracking and focusing of the optical pick-up apparatus 3. The high frequency amplifying unit 5 amplifies the signals from the optical pick-up apparatus 3 and then outputs those signals to the error correcting circuit 7.

Under the control of the navigator 17, the error correcting circuit 7 receives amplified signals output from the high frequency amplifying unit 5, corrects errors generated in a bit stream, and outputs error corrected signals to the VBR buffer 9 where those signals are temporarily stored.

The VBR buffer 9 simultaneously outputs reproduced data to the video signal processing circuit 21 and the navigator 17. The navigator 17 analyzes the system data based on the reproduced data output from the VBR buffer 9, divides the reproduced data, and supplies the divided reproduced data to the video signal processing circuit 21 which extracts only the video signals. Similarly, the graphics circuit 25 extracts only the caption signals, and the audio signal processing circuit 27 extracts only the audio signals.

The video signals input into the video signal processing circuit 21 are expanded and decoded under the control of the navigator 17, and decoded video signals are output from video signal processing circuit to the graphics circuit 25 and the digital/analog converter 23. The graphics circuit 25 extracts only the caption signals, decodes the caption signals under the control of the navigator 17, and then outputs the decoded caption signals in a language the user desires. The audio signal processing circuit 27 decodes the audio signals, and outputs decoded audio signals in a language the user selects.

By the above-described operations, the decoded video signals output from the video signal processing circuit 21 are converted into analog video signals and then displayed through the on-screen display 31. The decoded audio signals are also converted into analog audio signals and then output.

Figure 4:
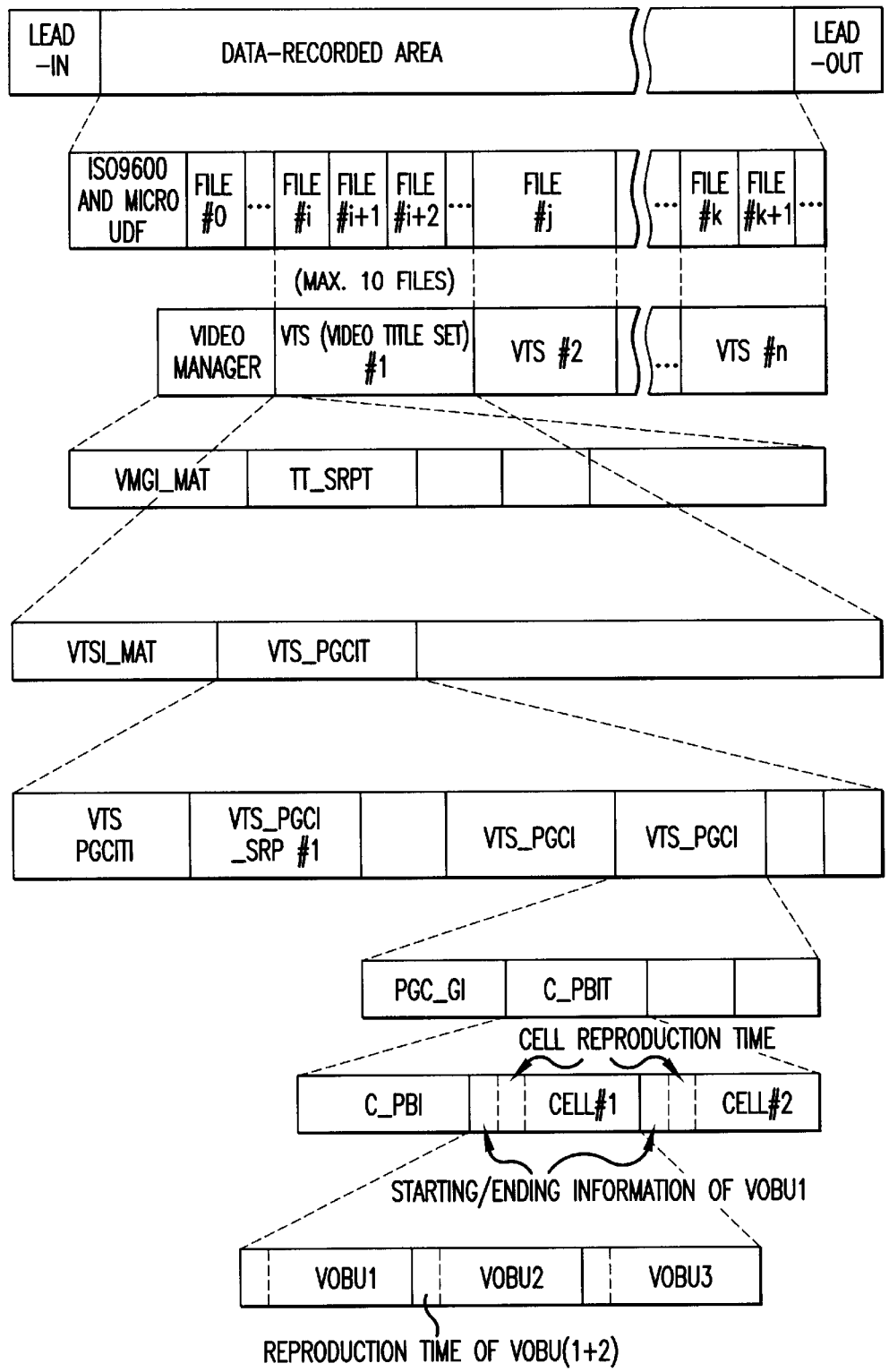
FIG. 4 is a detailed formation diagram of a DVD system data.

FIG. 4 is a detailed diagram of the system data of the DVD. As shown in FIG. 4, the data-recorded area of the DVD is composed of a plurality of Video Title Sets (VTSs) that are each composed of one or more files.

In front of a group of one or more VTSs, there is a video manager which stores the system data that controls the overall operation of the DVD. Each video manager comprises a Title Search Pointer Table (TT-SRPT) and a Video Manager Information Management Table (VMGI-MAT) which respectively store information related to the starting positions of the respective VTSs and TT-SRPTs.

Each of the VTSs (e.g. VTS#1) comprises a Video Title Set Program Chain Information Table (VTS-PGCIT) which stores Program Chain Information PGCI with regard to each of the files within the respective VTS, e.g., Video Title Set Program Chain Information Table (VTS-PGCIT), and a Video Title Set Information Management Table (VTSI-MAT) which stores information related to the starting position of the VTS-PGCIT. Since each VTS has one or more files and each file has a corresponding VTS-PGCIT, each VTS-PGCIT comprises a plural VTS-PGCIs. Each of the VTS-PGCIs in a VTS-PGCIT stores the reproduction time codes of a respective program chain and the PGCI of the respective file. Moreover, in each VTS-PGCIT, there are a plurality of VTS-PGCIs corresponding to a plurality of files, and in each of the VTS-PGCIs, there are reproduction time codes related to the respective file.

Each VTS-PGCIT further comprises a Video Title Set Program Chain Information Search Pointer (VTS-PGCI-SRP) which stores information regarding starting position of the VTS-PGCIs, and a Video Title Set Program Chain Information Table Information (VTS-PGCITI) which stores information regarding the starting position of the VTS-PGCI-SRP.

Each of the VTS-PGCIs comprises a Cell PlayBack Information Table (C-PBIT) which stores system information related to a plurality of cells included therein. The C-PBIT comprises a Cell PlayBack Information (C-PBI) and a plurality of cells within the respective VTS-PGCI. Each of the cells includes a plurality of VOBUs. Each of the VOBUs include a VOBU reproduction time code related to the respective VOBU, and each of the cells include a cell reproduction time code related to the respective cell. Each of the cells further comprises starting and ending position data related to the VOBUs included in the respective cell. Thus, data recorded on the DVD is reproduced by reproducing data recorded in each of the VOBUs in each of the plurality cells.

The VOBU reproduction time code for a VOBU does not represent the reproduction time of only that particular VOBU. Rather, the VOBU reproduction time code also represents the summarized reproduction time of other VOBUs in the cell. For example, the reproduction time code of the second VOBU (VOBU2 in FIG. 4) represents the sum of the reproduction time of VOBU1 and the reproduction time of VOBU2. Therefore, the summarized reproduction time of all VOBUs reproduced can be produced based solely on the reproduction time code of the present VOBU being reproduced.

Figure 5A:
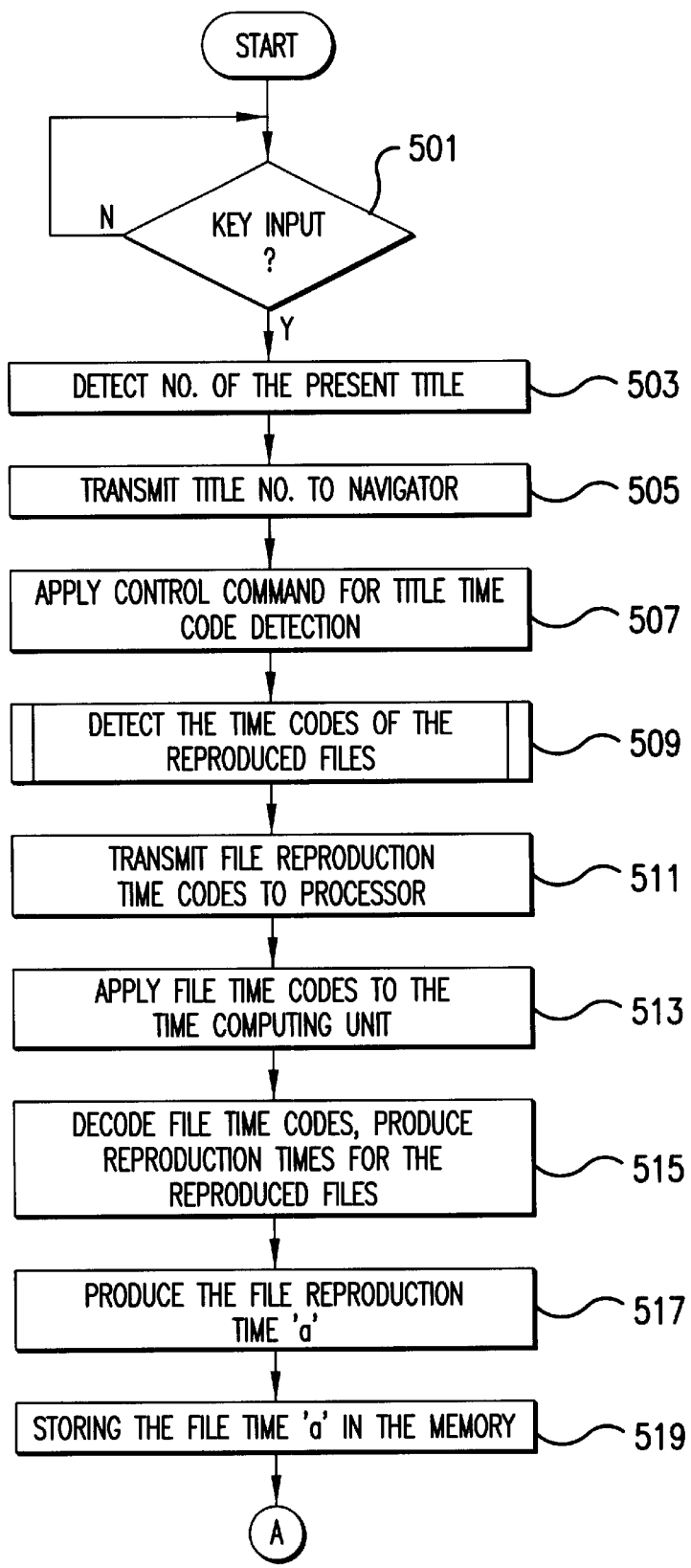
FIGS. 5A to 5C are components of a flow chart for producing a performed time of the optical disc according to the present invention.
Figure 5B:
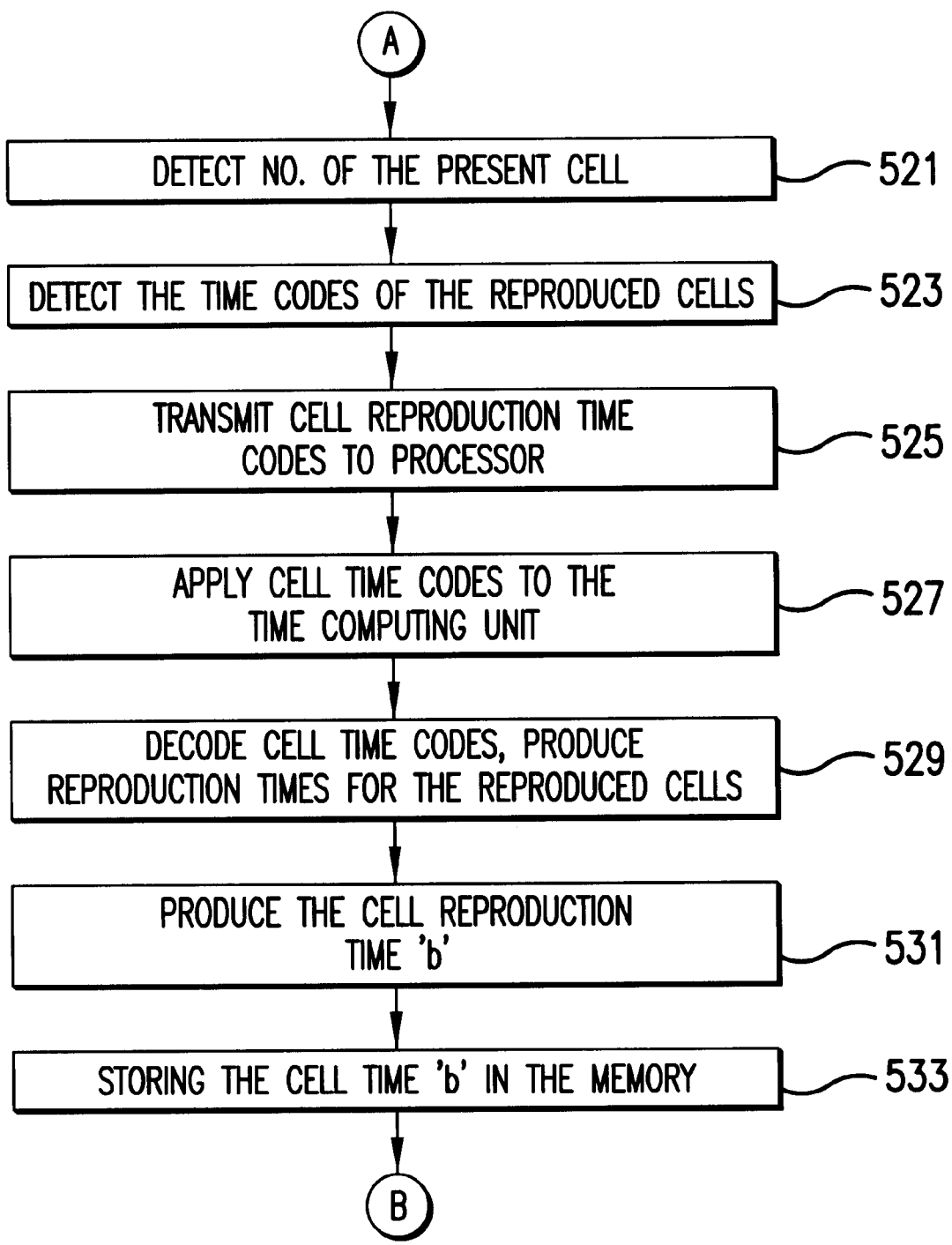
Figure 5C:
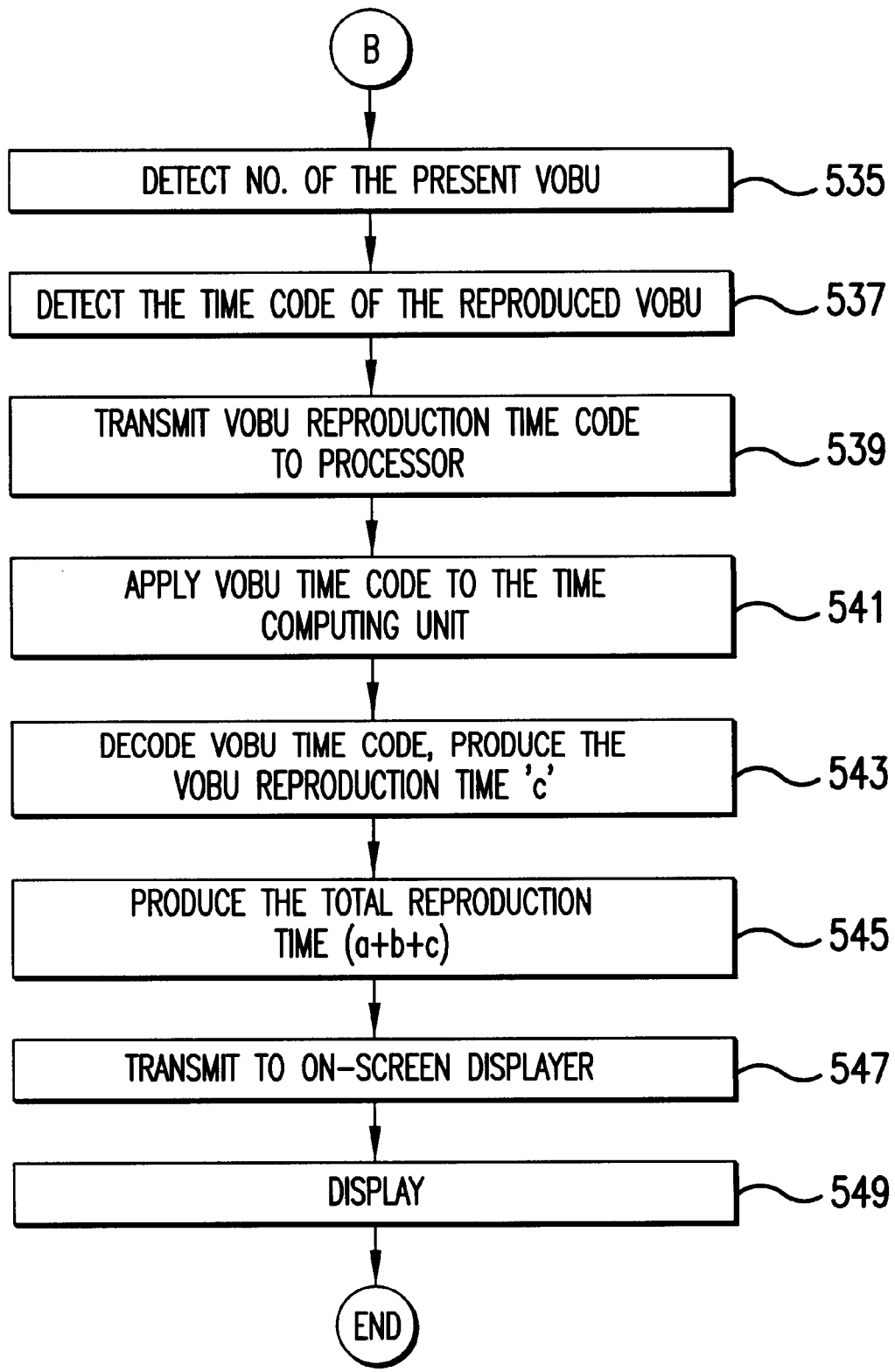

FIGS. 5A–5C are flow charts describing a method for producing the performed time of the optical disc according to the first preferred embodiment of the present invention.

During the reproduction of data from the optical disc, the processor 15 continuously monitors whether the user wants to display the reproduction time (step 501). Step 501 may be implemented by the processor 15 upon the user's request regarding the reproduction time display via a signal input, e.g. by keyboard input means (not illustrated in the attached drawings). If the user wants to display the reproduction time in step 501, the processor 15 controls the display of the reproduction time as follows.

First, the processor 15 detects the number of the present title (step 503). Since the apparatus of the present invention selectively executes a predetermined one of the plurality of titles in the DVD, the reproduction time can be produced by obtaining reproduction time code data of the present title when the number of the present title is detected.

After the number of the present title is detected in step 503, the processor 15 will transmit the number to the navigator 17 (step 505), and apply a control command to the navigator 17 so that the navigator 17 will detect the reproduction time code data included in the system data of the present title, and will send that reproduction time code data to the processor 15 (step 507). When the control command is transmitted to the navigator 17, a data detecting unit 19 in the navigator 17 detects the system data from the reproduced signal data output from the VBR buffer 9 (step 509).

The reproduction time code data, and thus the corresponding reproduction time, is detected by identifying the file reproduction time code data of a plurality of files included in the title being reproduced, the cell reproduction time code data and the VOBU reproduction time code data. For example, the navigator 17, searches the PGCIs of the plurality of files of the present title from the reproduced signal data output from the VBR buffer 9, since the above various reproduction time code data are recorded in the PGCIs.

Figure 6:
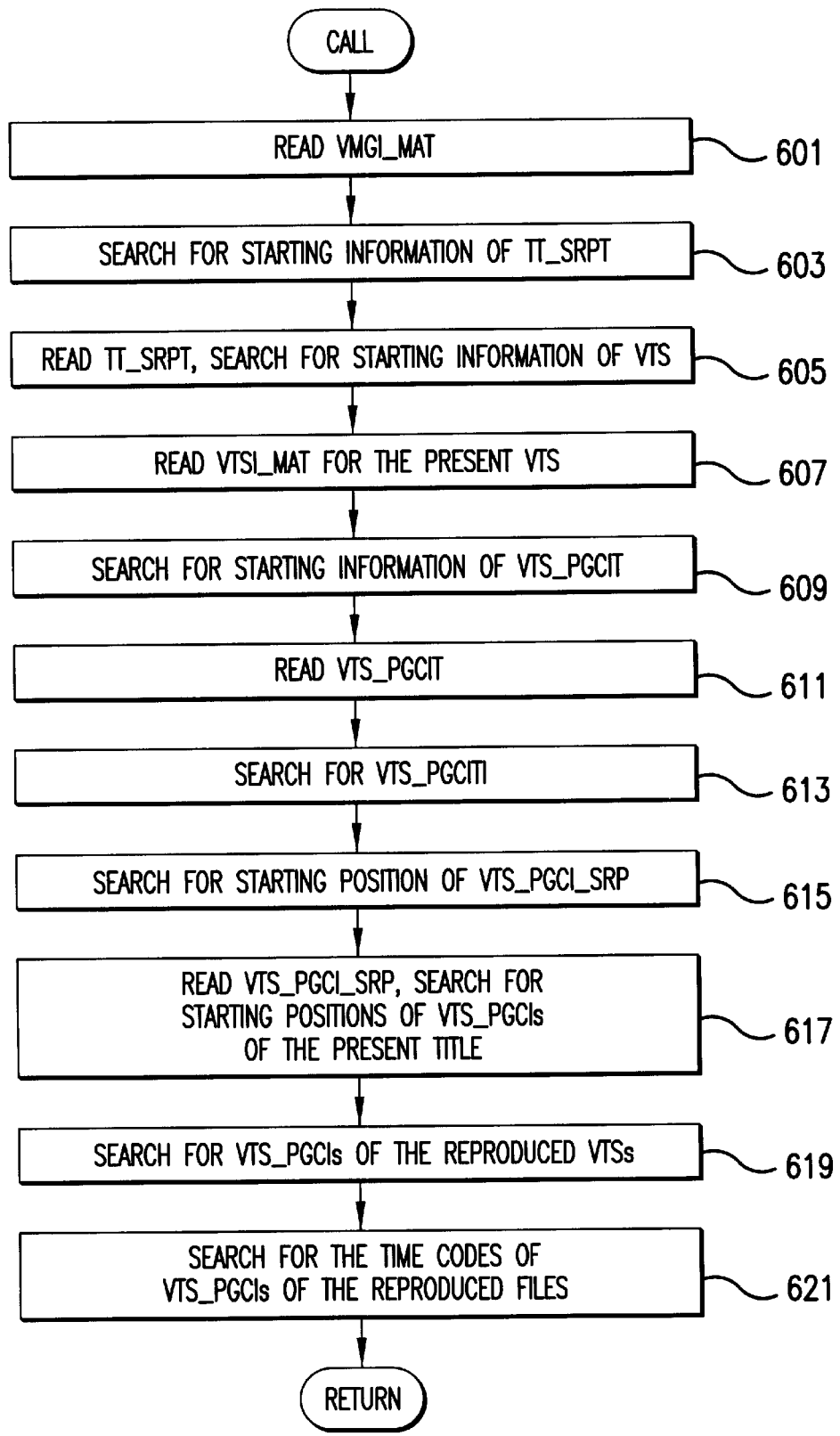
FIG. 6 is a flow chart for detecting the respective time code data for the respective reproduced files corresponding to FIGS. 5A to 5C.

The file reproduction time code data of the plurality of files included in the present title are searched by following steps with reference to FIG. 6. The VMGI-MAT of the respective VTSs is read from the reproduced signal data (step 601). The information of the starting position of the TT-SRPT, which stores the information of the starting positions regarding the respective VTSs, is searched (step 603), and then the TT-SRPT is read (step 605).

By step 605, starting information of the present title is detected. Furthermore, by step 605, the starting position of the VTS being presently reproduced may also be known. The VTSI-MAT of the present VTS is then read (step 607). At step 609, the starting information of the VTS-PGCIT of the respective VTS is searched from the VTSI-MAT, and the VTS-PGCIT is read at step 611.

At step 613, the VTS-PGCITI of the VTS-PGCIT is searched. At step 615, the starting position of the VTS-PGCI-SRP is searched, and then the VTS-PGCI-SRP is read at step 617 to determine the starting position of the respective VTS-PGCI. Since the present title comprises a plurality of files each of which has at least one VTS-PGCI, the present title also has a plurality of VTS-PGCIs. That is, when the predetermined title is reproduced, the VTS-PGCIs of the respective files are sequentially detected from the respective VTS-_PGCIT as the plurality of files of the title recorded in the DVD are sequentially reproduced (step 619).

Moreover, the VTS-PGCI of each of the plurality of files of the present video title is searched by step 601 to step 619. Thereafter, at step 621, the file reproduction time code data of files already reproduced prior to the present file being presently reproduced are detected from their respective VTS-PGCIs. For example, as shown in FIG. 4, if file#i+2 in VTS#1 is being reproduced, the file reproduction time code data included in the VTS-PGCIs of files reproduced (file#i to file#i+1) can be detected. Alternatively, time code data included in the VTS-PGCI: of files reproduced can be read out from a buffer in which they are stored as those files are reproduced, as described previously. Next, the process returns to step 511 in FIG. 5A.

In step 511, the detected file reproduction time code data included in the VTS-PGCIs are transmitted to the processor 15. In step 513, the processor 15 receives file reproduction time code data of all files reproduced in the present title and transfers them to the time computing unit 14. The time computing unit 14 decodes the file reproduction time code data transmitted to processor 15, converts them into the reproduction times (step 515), and then computes the file reproduction time 'a' summarized in step 517. Therefore, the file reproduction time code data of all reproduced files in the present video title are computed as 'a' which is then stored temporarily by a storing means (not shown) in the processor 15 at step 519.

At step 521 of FIG. 5B, the number of the present cell being presently reproduced in the present file is detected. At step 523, the cell reproduction time code data of all cells reproduced prior to the cell which is being reproduced are detected.

The cell reproduction time code data detected are transmitted to the processor 15 (step 525), and then the processor 15 transmits the cell reproduction time code data into the time computing unit 14 (step 527). The time computing unit 14 decodes the cell reproduction time code data input from the processor 15 and converts them into the cell reproduction times (step 529), and then computes the cell reproduction time 'b' summarized in step 531. Therefore, the cell reproduction time code data of all cells reproduced in the present file are computed into the cell reproduction time 'b', which is then stored temporarily in the storage means (not shown) of the processor 15 (step 533).

Finally, as shown in FIG. 5C, the number of the present VOBU being presently reproduced in the present cell is detected (step 535), and the VOBU reproduction time code data of the present VOBU is detected (step 537). The VOBU reproduction time code data represents the VOBU reproduction time 'c' which includes the VOBU reproduction time of all VOBUs already reproduced prior to the present VOBU and the VOBU reproduction time of the present VOBU in the present cell. The detected VOBU reproduction time code data is transmitted to the processor 15 (step 539). The processor 15 transmits the VOBU reproduction time code data into the time computing unit 14 (step 541). The time computing unit 14 decodes the VOBU reproduction time code data input from the processor 15 and converts it into the VOBU reproduction time 'c' (step 543).

By step 509, step 523 and step 537, reproduction time code data of reproduced files, cells and VOBUs are completely identified, respectively. And, by steps 511 to 517, steps 525 to 531 and steps 539 to 543, the reproduction time code data regarding the reproduced files, cells and VOBUs are converted into the reproduction times 'a', 'b' and 'c', respectively. Next, the processor 15 computes the total sum of the file reproduction time of the files reproduced, the cell reproduction time of the cells reproduced and the VOBU reproduction time of the VOBUs reproduced, and produces the total performed time (a+b+c), i.e., the performed time, which the user wants (step 545).

The reproduction time (a+b+c) by the above steps is transmitted from the processor 15 to the on-screen display 31. (step 547), and then displayed by the on-screen display 31 as signals synchronized with video signals of the DVD (step 549).

In short, the reproduction time of the optical disc is identified according to the above preferred embodiment by detecting the reproduction time code data with the navigator 17 and by decoding the reproduction time code data with the processor 15. During the process for producing the reproduction time, the optical disc may be continually reproduced. Subsequently, when the user wants to display the reproduction time, the signal which represents the reproduction time identified is mixed and displayed with the video signals of the DVD. Alternatively, it may be possible to modify the present invention such that the reproduction time is also displayed in response to the input of a reproduction key or other form of user request.

Figure 7A:
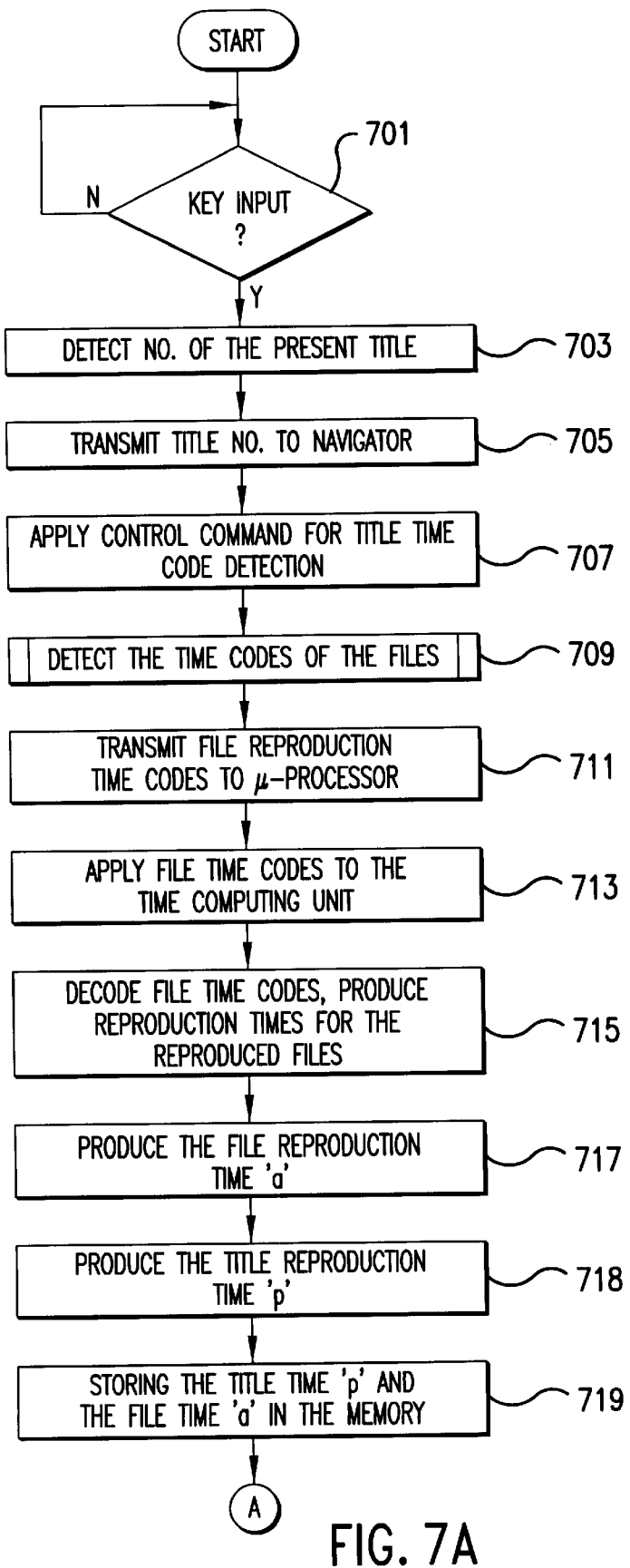
FIGS. 7A to 7C are components of a flow chart for producing the remaining time of the optical disc according to the present invention.
Figure 7B:
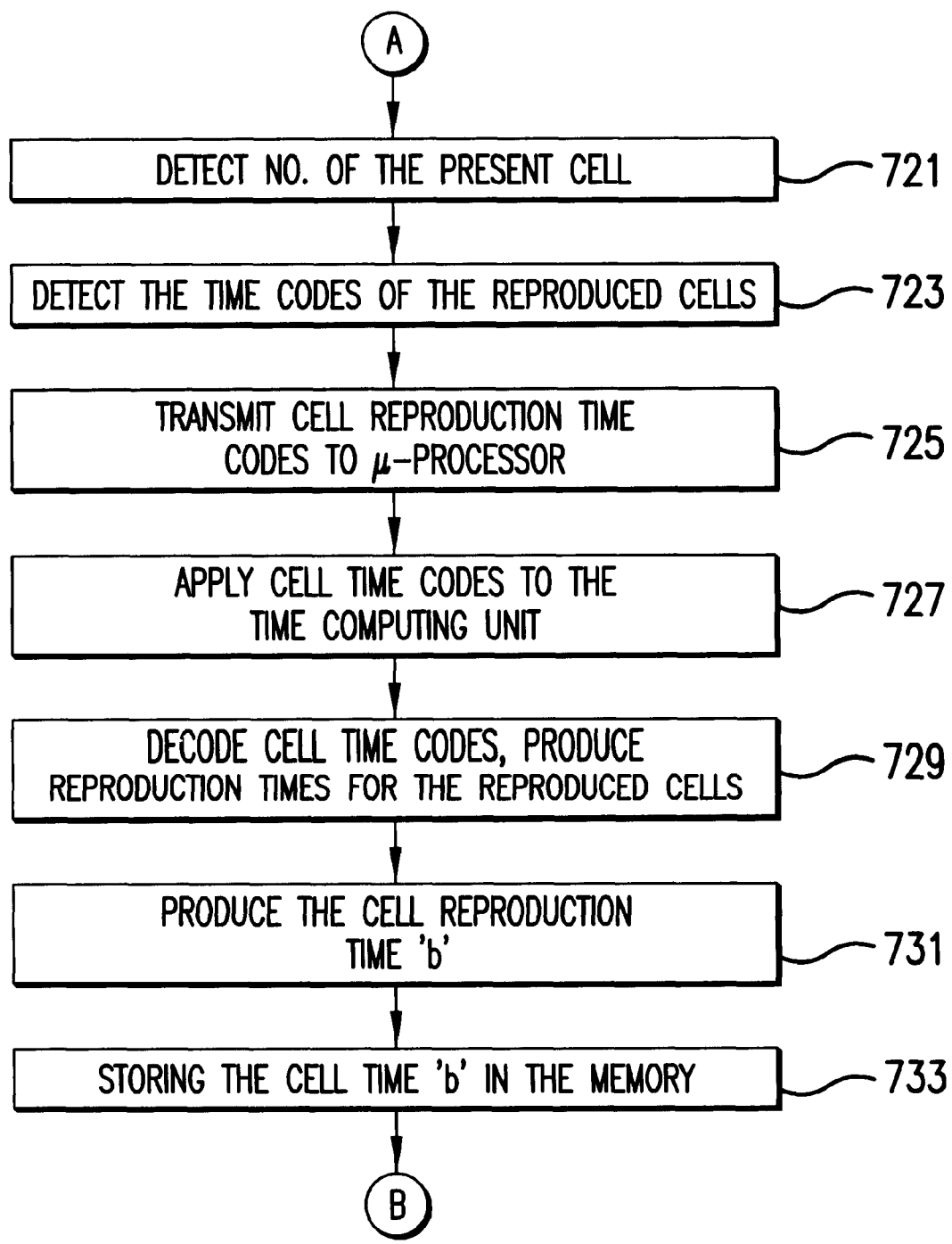
Figure 7C:
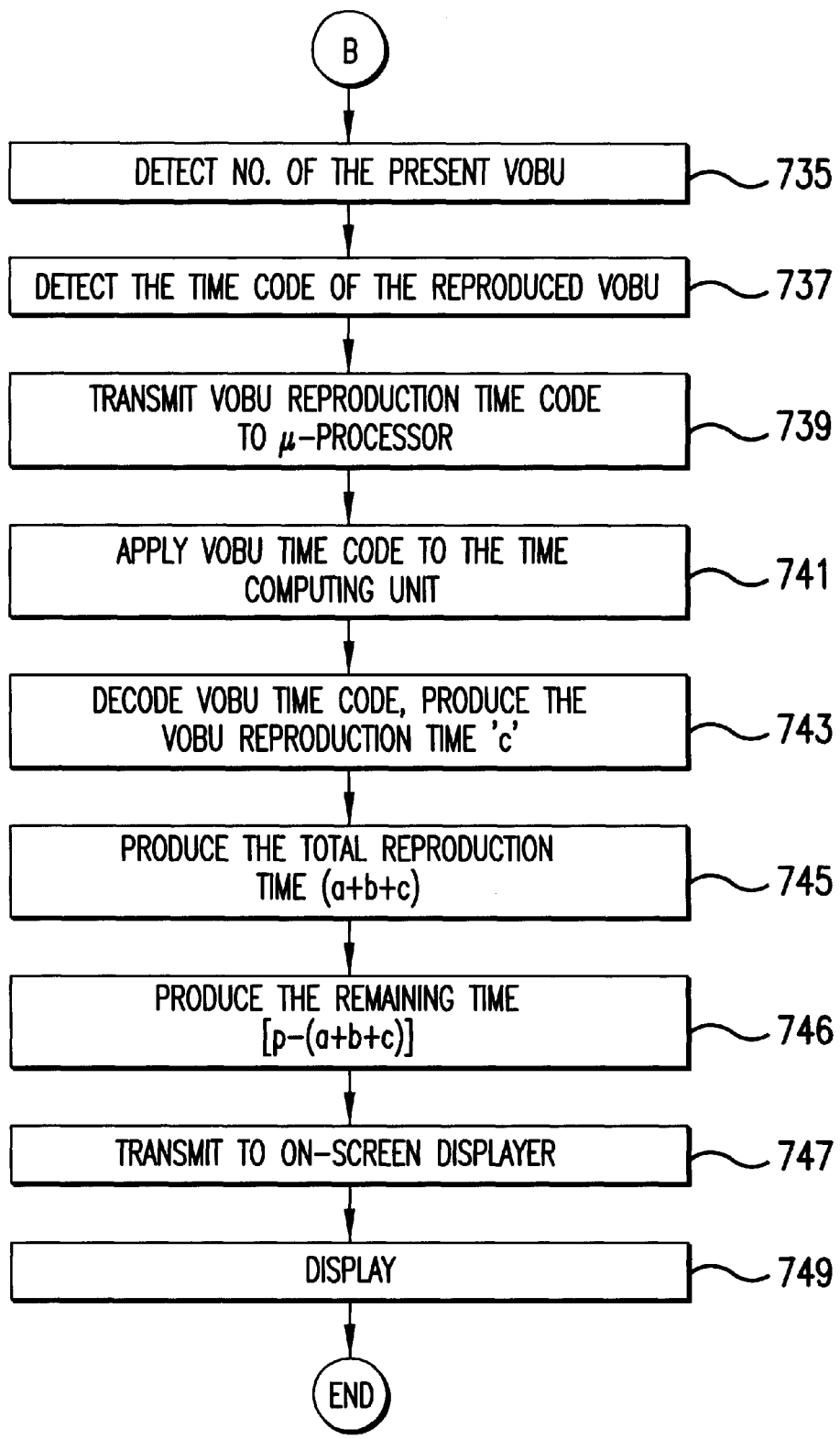

FIGS. 7A, 7B and 7C are flow charts describing the method for producing the remaining portion of time of the optical disc, i.e., the time which will be consumed for reproducing the remaining portion of the optical disc or programs thereon, according to the second preferred embodiment of the present invention.

Figure 8:
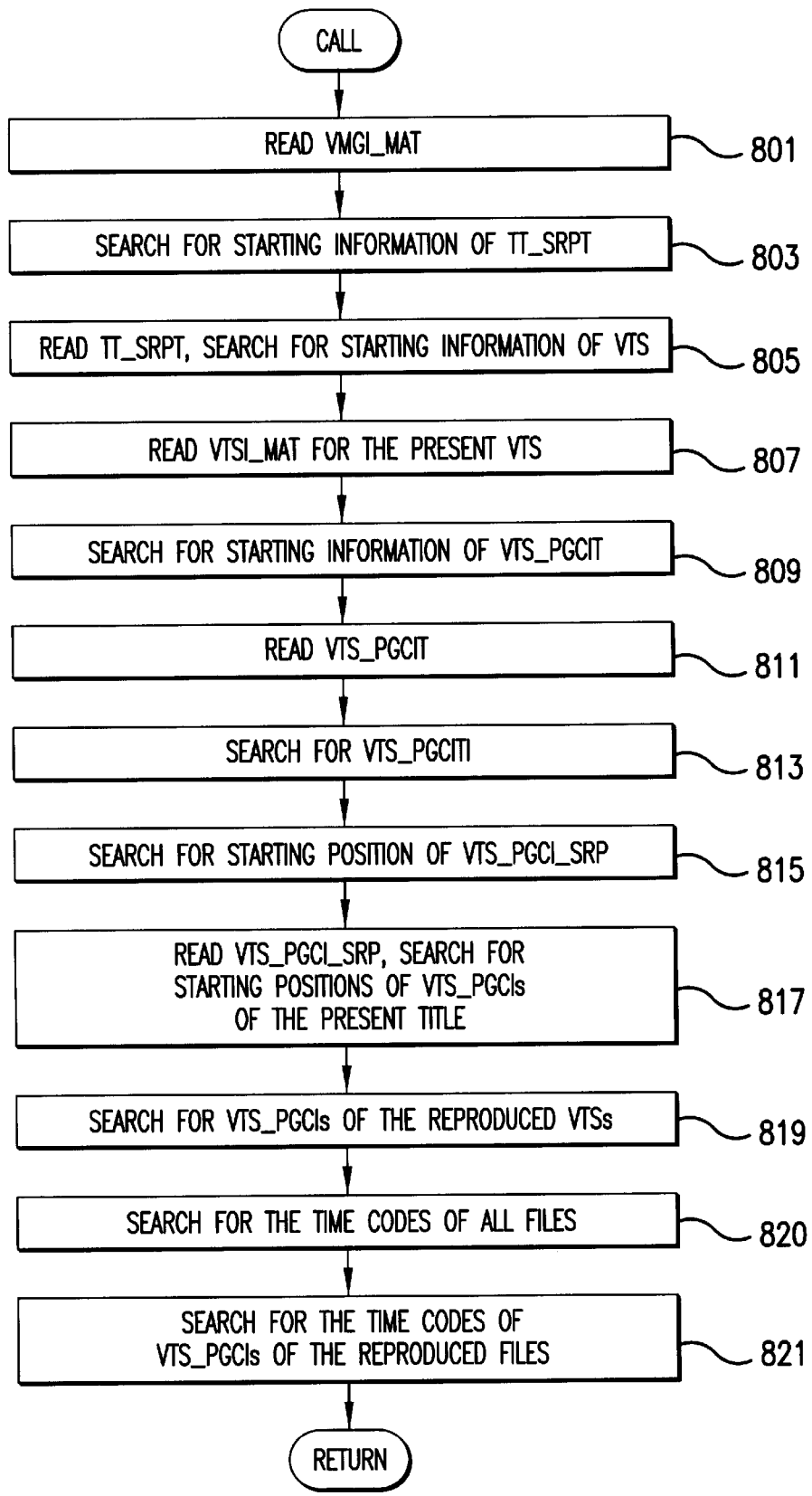
FIG. 8 is a flow chart for detecting the respective time code data for the respective files corresponding to FIGS. 7A to 7C.

The method of the second preferred embodiment is similar to that of the first embodiment illustrated by FIGS. 5A–5C and 6. However, the second preferred embodiment further comprises a step in which the reproduction time computed of the present video title is produced. The method of the second preferred embodiment is illustrated in FIGS. 7A–7C and 8, where sub-steps of step 709 in FIG. 7 are represented by steps 809–819 of FIG. 8. Step 701 in FIG. 7A to step 819 in FIG. 8 are essentially the same as the corresponding steps of the first preferred embodiment, and are not further discussed for that reason. However, in step 820, the file reproduction time code data of all files are detected from the respective PGCIs included in the VTS_PGCIT of the present title. Moreover, while the predetermined title (e.g. VTS#1 in FIG. 4) is being reproduced, if the user wants to display the remaining time of the title, the reproduction time code data of all files are detected from the respective PGCIs regarding the respective files of the present title (VTS#1) (step 820).

Subsequently, the steps from step 821 in FIG. 8 to step 717 in FIG. 7A are essentially the same as corresponding steps of the first preferred embodiment, except that the reproduction time code data of all the detected files are transmitted, input and decoded, even those not yet fully reproduced. That is, step 715 in FIG. 7A also includes the step of decoding the reproduction time code data of all the files detected into the reproduction times. Also, the file reproduction times of all the files are summed and a title reproduction time 'p' is calculated and temporarily stored in a storing means (step 718).

Thereafter, steps from step 719 in FIG. 7A to step 745 in FIG. 7C are essentially the same as the corresponding steps of the first preferred embodiment. At step 746, the total performed time (a+b+c) title reproduction time 'p', and the remaining time [p−(a+b+c)] is produced (step 746).

The performed time (a+b+c) and/or the remaining time [p−(a+b+c)] will be transmitted from the processor to the on-screen display 31 (step 747), and then displayed by the on-screen display 31 as signals synchronized with reproduced video signals (step 749), as in the first preferred embodiment.

Figure 9A:
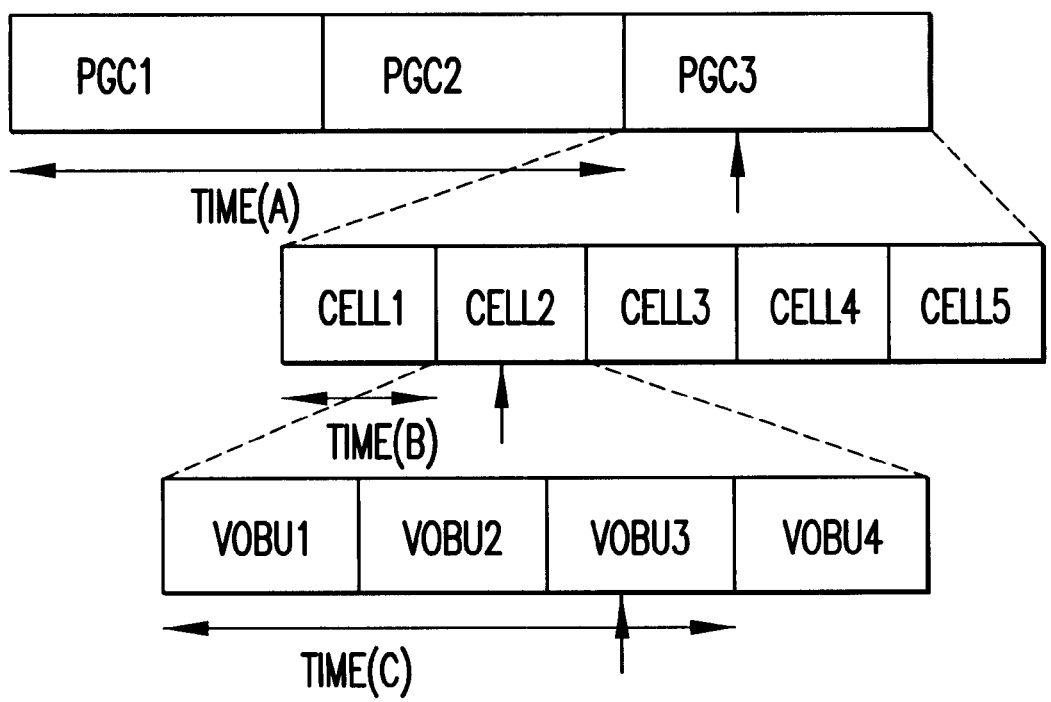
FIG. 9A is a diagram showing a relationship between files, cells, and VOBUs and the reproduction time code information therein.

The file reproduction times of the files is reproduced, the cell reproduction times of the cells reproduced and the VOBU reproduction times of the VOBUs reproduced may be reproduced in response to a request, or they may be continually updated during the reproduction of data from the DVD. For instance, the buffer memory of processor 15 may store and update reproduction time code data as a program is being reproduced so that the reproduction time can be quickly calculated upon user request. More specifically, if the arrows of FIG. 9A represent a position of data being reproduced from a DVD and the buffer memory of processor 15 includes a memory area as shown in FIG. 9B, then the reproduction time could be quickly and easily obtained by performing steps 545–549 of FIG. 5C or steps 745–749 of FIG. 7C, depending on whether the user request is for produced or remaining time. Such a buffer could be continually updated based on the reproduced time code information of each new file, cell and VOBU.

Note that the reproduction time code data from files and cells are added with reproduction time codes from previously reproduced files and cells. However, the reproduction time code data for a presently reproduced VOBU replaces VOBU reproduction time codes from previously reproduced VOBUs, since the reproduction time code for any VOBU represents the reproduction time for that VOBU as well as all previously recorded VOBUs in the cell.

The buffer memory of processor 15 may also include title reproduction time, as shown in FIG. 10B, which is obtained with respect to the reproduction time of an entire title. For instance, as described in step 718 of FIG. 7, if a request is made for remaining reproduction time, title reproduction time can be used in conjunction with the other stored reproduction time as described in steps 745–749, or the title reproduction time can be independently obtained in response to the request.

As shown above, the present invention relates to a method for producing the reproduction time of the optical disc which enables the reproduction of the performed time and/or the remaining time. The present invention makes it possible to reproduce the reproduction time of the DVD whose sectors, unlike those of the CD, have variable sizes. The present invention detects reproduction time code data of respective files, cells and VOBUs from respective program chain information, cell information and VOBU information of the present title. The reproduction time is then generated by summing and subtracting respective time code data. The performed time and/or the remaining time may be displayed on the displaying apparatus depending on the user's request.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a continuation or divisional application.

With this in mind, it is intended that the following claims define the scope of the invention and that methods and apparatuses within the scope of these claims and their equivalents are covered thereby.

What is claimed is:

1. A method for computing a play back time in accordance with reproducing data recorded on an optical storage medium that includes a plurality of first management data units and a plurality of second management data units, the plurality of first management data units having a hierarchical data structure relative to the plurality of second management data units, each first management data unit of the plurality of first management data units corresponding to a first data, unit and information corresponding to a first playback time of the first data unit, each second management data unit of the plurality of second management data units corresponding to second data units and information corresponding to an accumulative second playback time for the second data units, said method comprising:

reproducing first data units and second data units using the plurality of first management data units and the plurality of second management data units, respectively;

performing a first detection of the first playback times of each reproduced first data unit;

accumulating the first playback times;

performing a second detection of the second playback times of each second data unit; and determining a total playback time based on the accumulated first playback times and the second detection of the second playback times.

2. The method of claim 1, wherein each first management data unit corresponds to a cell specified in a digital versatile disc data format.

3. The method of claim 1, wherein each second management data unit corresponds to a video object unit specified in a digital versatile disc data format.

4. The method of claim 1, wherein each second management data unit is adjacent a corresponding second data unit.

5. A method for computing a play back time in accordance with reproducing data recorded on an optical storage medium that includes a plurality of first management data units and a plurality of second management data units, the plurality of first management data units having a hierarchical data structure relative to the plurality of second management data units, each first management data unit of the plurality of first management data units corresponding to a first data unit and information corresponding to a first playback time of the first data unit, each second management data unit of the plurality of second management data units corresponding to second data units and information corresponding to an accumulative second playback time for the second data units, said method comprising:

reproducing first data units and second data units using the plurality of first management data units and the plurality of second management data units, respectively;

performing a first detection of the first playback times of each reproduced first data unit and a first data unit currently being reproduced;

accumulating the first playback times;

performing a second detection of the second playback times of each second data unit; and determining a total playback time based on the accumulated first playback times and the second detection of the second playback times.

6. The method of claim 5, wherein each first management data unit corresponds to a cell specified in a digital versatile disc data format.

7. The method of claim 5, wherein each second management data unit corresponds to a video object unit specified in a digital versatile disc data format.

8. The method of claim 5, wherein each second management data unit is adjacent a corresponding second data unit.

9. An apparatus for computing a play back time in accordance with reproducing data recorded on an optical storage medium that includes a plurality of first management data units and a plurality of second management data units, the plurality of first management data units having a hierarchical data structure relative to the plurality of second management data units, each first management data unit of the plurality of first management data units corresponding to a first data unit and information corresponding to a first playback time of the first data unit, each second management data unit of the plurality of second management data units corresponding to second data units and information corresponding to an accumulative second playback time for the second data units, said apparatus comprising:

a first detector for detecting the first playback time of each first data unit that has been reproduced from the first management data unit;

an accumulator for accumulating each first playback time;

a second detector for detecting the accumulative second playback time from the initial second data unit; and a controller for computing the total playback time based on the accumulated first playback time and the detected accumulative second playback time.

* * * * *